United States Patent
von Kaler

[11] Patent Number: 5,918,709
[45] Date of Patent: Jul. 6, 1999

[54] AUTOMATIC BRAKE ADJUSTMENT

[76] Inventor: Roland L. von Kaler, 3328 Meadowbrook Ct., Tecumseh, Mich. 49286

[21] Appl. No.: 09/048,027

[22] Filed: Mar. 23, 1998

[51] Int. Cl.$^6$ .................................................... F16D 65/38
[52] U.S. Cl. .................. 188/196 B; 188/72.7; 188/72.9; 188/196 D; 74/411.5
[58] Field of Search ................... 188/72.7, 72.8, 188/72.9, 196 D, 196 B; 74/411.5

[56] References Cited

U.S. PATENT DOCUMENTS

| | | | |
|---|---|---|---|
| 3,111,198 | 11/1963 | Hodkinson | 188/72.9 |
| 3,463,274 | 8/1969 | Hollnagel et al. | 188/72.7 |
| 3,545,573 | 12/1970 | Barton | 188/72.9 |
| 3,850,268 | 11/1974 | Guettier | 188/72.9 X |
| 3,853,206 | 12/1974 | Kibler et al. | 188/72.9 |
| 4,390,085 | 6/1983 | Downing et al. | 188/72.9 |
| 4,903,546 | 2/1990 | Quintille | 74/411.5 X |
| 5,094,121 | 3/1992 | Von Kaler | 74/475 |
| 5,195,386 | 3/1993 | Havens et al. | 74/411.5 |
| 5,263,556 | 11/1993 | Frania | 188/196 D X |
| 5,718,308 | 2/1998 | Chung | 188/72.7 X |

*Primary Examiner*—Peter M. Poon
*Assistant Examiner*—Pamela J. Lipka
*Attorney, Agent, or Firm*—Young & Basile, P.C.

[57] ABSTRACT

An automatic brake adjustment for small transmissions, such as used with riding lawn mowers and the like. A brake disc rotated by the transmission is selectively engaged by friction producing pucks brought into engagement with the brake disc by a rotatable lever having a cam operating a puck. The axial position of the brake lever on its supporting shaft is determined by a threaded nut and automatic rotational nut adjustment is produced by a wheel having evenly spaced shoulders in the form of ratchet teeth defined upon its periphery selectively and sequentially engaged by a detent mounted upon the brake lever. When puck wear of sufficient extent occurs, the detent will sequentially engage the following shoulder of that previously engaged to rotate the brake lever adjustment nut during the next brake actuation thereby translating the brake lever and puck toward the brake disc to compensate for puck wear.

5 Claims, 2 Drawing Sheets

AUTOMATIC BRAKE ADJUSTMENT

BACKGROUND OF THE INVENTION

1. Field of the Invention

The invention pertains to transaxle brakes for small transmissions and particularly pertains to an automatic brake adjustment for such transmissions to compensate for wearing of the brake engaging elements.

2. Description of the Related Art

Transmissions for small vehicles such as riding lawn mowers often include a brake disc which is rotated by one of the shafts of the transaxle. Braking of the rotation of such discs serves to brake the drive train movement of the associated gearing and such braking occurs through the movement of friction shoes or pucks which engage the brake disc under the operation of a pivoted lever. A transmission of this general type using a disc brake system is shown in U.S. Pat. No. 4,966,574. A similar braking system for small transmissions constituting an improvement of the above cited patent is disclosed in U.S. Pat. No. 5,195,386. The disclosures of both of these patents are incorporated into this application by reference.

In the braking systems disclosed in the aforementioned patents, the brake disc is frictionally engaged by pucks engaging opposite sides of the disc upon a brake lever being rotated in a braking direction. The brake disc is axially movable a limited degree upon its supporting shaft, and a cam arrangement defined on the brake lever, through operating pins, forces the brake puck on one side of the disc against the disc axially translating the disc against the opposing friction puck to apply a braking action to the disc from both disc sides.

The axial position of the brake lever on its supporting shaft is determined by a nut threaded upon the brake lever shaft and as the friction pucks wear, it is possible to compensate for this wear by manually rotating the brake lever nut to translate the brake lever toward the brake disc whereby an effective braking action will be produced during the normal operating range of the brake lever. The brake lever is usually connected to a foot operated brake pedal, and as the friction pucks wear, greater foot pedal movement is required to produce braking.

While it is possible to compensate for the wear occurring in the friction pucks by periodically tightening the nut on the brake lever shaft, such adjustments are often neglected due to ignorance on the part of the operator and the fact that the unskilled operator does not understand that the brake lever positioning nut needs to be adjusted as the friction material on the pucks is consumed. Accordingly, the necessary maintenance of the braking system is ignored and the transmission brake disc is not properly retarded when the brake pedal is operated, and with riding lawn mowers, it is not uncommon to have ineffective braking due to friction shoe or puck wear which produces a hazardous safety situation.

OBJECTS OF THE INVENTION

It is an object of the invention to provide an automatic brake adjustment system for small vehicle transmissions using a disc brake wherein the operating mechanism for the disc brake friction elements automatically compensates for wear of the friction element material and separate brake maintenance and servicing is not required.

Another object of the invention is to provide an automatic brake adjusting system for small transmissions using a disc brake selectively retarded by friction producing pucks positioned by operating pins controlled by a cam associated with a brake lever wherein the axial position of the brake lever and cam on its support shaft is automatically determined by the degree of rotation of the brake lever permitted by the pucks wherein brake lever movement is sensed by the automatic brake adjustment and excessive brake lever movement is compensated for and reduced by the automatic axial repositioning of the brake lever and cam.

An additional object of the invention is to provide an automatic brake adjusting system for small transmissions using a disc brake wherein brake friction pucks are forced into engagement with the brake disc by a rotating brake lever such that excessive brake lever movement indicating puck wear produces a repositioning of the brake lever to compensate for consumption of the braking material located on the pucks.

Yet a further object of the invention is to provide an automatic brake adjusting system for small transmissions which may be retrofitted to existing small transmissions utilizing disc brakes without extensive modification to the existing brake structure.

SUMMARY OF THE INVENTION

A small transmission utilizing the concepts of the invention includes a brake disc rotated by the gearing within the transaxle transmission. Braking of the disc brakes the transmission train to brake the associated vehicle from moving in either a forward or rearward direction. Control of the rotation of the brake disc is accomplished through pucks located upon opposite sides of the brake disc each having a friction material adapted to engage the disc sides during disc retardation and the position of the pucks is controlled by a pair of axially movable pins engaging a cam defined on a pivotal brake lever usually operated by the vehicle brake pedal.

As the pin operating cam is mounted upon the brake lever, the axial position of the brake lever upon its support shaft determines the axial position of the pins, and the positioning of the pucks relative to the brake disc. The axial position of the brake lever is determined by a nut mounted upon the threaded brake lever support shaft which engages the brake lever and positions the brake lever relative to the brake disc during braking. The automatic brake adjustment system of the invention produces rotation of the brake lever positioning nut when wear occurs in the brake disc engaging pucks, and the need for such brake lever adjustment is sensed by the position of the brake lever during braking.

The automatic brake adjustment system includes a wheel mounted upon the brake positioning nut and this wheel has a circular periphery upon which a plurality of evenly spaced radially extending shoulders are defined on a set of ratchet teeth. The ratchet teeth each include the radially disposed shoulder intersecting an obliquely oriented surface to permit the detent to ride over the teeth when the brake lever is rotated in the brake releasing direction.

A detent is mounted upon the brake lever and includes a resilient projection capable of riding over the oblique surface of the wheel ratchet teeth or for engagement with a tooth shoulder. Accordingly, as the brake lever is rotated in a braking direction, the detent projection will engage a tooth shoulder as braking occurs and the wheel thereby senses the degree of rotation of the brake lever necessary to produce braking of the brake disc.

When the brake lever is pivoted in the brake releasing direction, the detent, which is in the form of a relatively wide tooth engaging projection, will be moving over the wheel ratchet tooth immediately below the detent projection, and under normal circumstances, a stop limiting brake lever movement in the brake releasing direction will terminate brake lever movement before the detent moves in the brake releasing position sufficiently to permit the detent projection to drop over a tooth apex and engage the shoulder of the "trailing" tooth. Accordingly, movement of the brake lever in the next braking direction causes the detent to move over the engaged wheel tooth apex and ultimately engage the shoulder of the next wheel ratchet tooth as braking occurs. Braking of the brake disc will occur as the brake lever is rotated in the braking direction sufficiently to apply the necessary friction through the pucks to the brake disc.

As wear occurs of the friction material of the pucks during braking, it is necessary for the brake lever to slightly rotate a greater degree in the braking direction during each braking cycle. This greater movement of the braking lever is transferred to the wheel by the engagement of the brake lever mounted detent projection with the forward ratchet tooth shoulder upon sufficient wear of the pucks occurring, and the brake lever will rotate the wheel sufficiently to permit the detent, when the brake lever is fully moved to the brake releasing position, to drop down over the supporting ratchet tooth apex for engagement with the following ratchet tooth shoulder. Thus, during the next braking cycle, the detent will rotate the wheel in a nut tightening direction axially shifting the brake lever upon its shaft toward the brake disc a small distance thereby compensating for wear that has occurred within the friction pucks. This axial movement of the brake lever upon its supporting shaft permits the pucks to effectively frictionally engage the brake disc to produce the necessary braking action. Thereafter, sequential braking cycles and operations of the brake lever will permit a number of braking operations with incremental rotation of the wheel, and only after the friction material of the pucks has sufficiently worn will the detent engage the "trailing" ratchet tooth shoulder.

In the aforedescribed manner, automatic adjustment of the brake lever positioning nut is accomplished as the brake disc pucks wear and because the invention permits the pucks to be automatically adjusted over a considerable period of time, only infrequent replacement of the pucks is required to produce consistent efficient braking.

As the automatic brake system of the invention can be retrofitted to existing transmissions using a disc brake, pucks and brake lever, the inexpensively produced automatic brake mechanism of the invention can be readily installed upon existing small transmissions requiring only minor modification to existing equipment.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
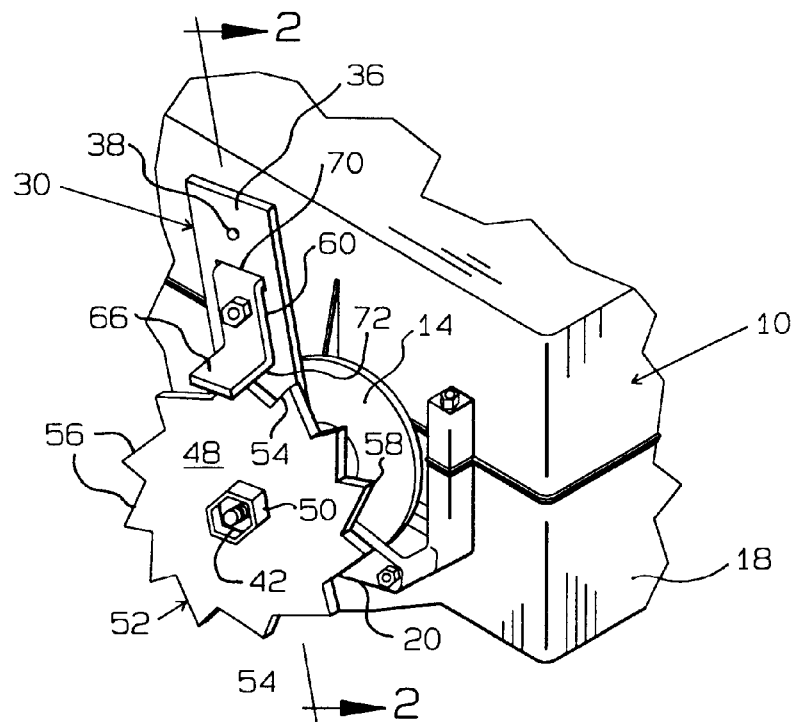
FIG. 1 is a perspective detailed view of an automatic brake adjusting system for small transmissions in accord with the invention.

With reference to the figures, a transmission for a riding lawn mower or similar small vehicle is generally represented at 10 wherein the transmission comprises a transaxle which includes both transmission and axle gearing in a common housing. The transaxle 10, and much of the transaxle brake structure described below, is similar to that shown in U.S. Pat. No. 5,195,386, and the disclosure of this patent is herein incorporated by reference.

The gearing within the transaxle 10 is capable of being braked in order to control the vehicle, and the transaxle braking structure includes a shaft 12 connected to the transaxle gearing for rotation therewith, and a double sided disc brake 14 is mounted upon the shaft 12. Rotation of the disc brake 14 is controlled by friction producing pucks wherein the inner puck 15 engages the inside surface of the disc brake 14 while the outer friction puck 16 engages the outer disc brake surface in opposition to the puck 15. The pucks include a friction producing material which slowly wears, and it is this puck wear toward which the instant invention is directed. The disc brake 14 is capable of limited axial displacement on the brake shaft 12 whereby movement of the outer friction puck 16 toward the puck 15 displaces the disc brake toward the transaxle whereby the pucks will produce a substantially equal frictional engagement with the disc brake.

Figure 2:
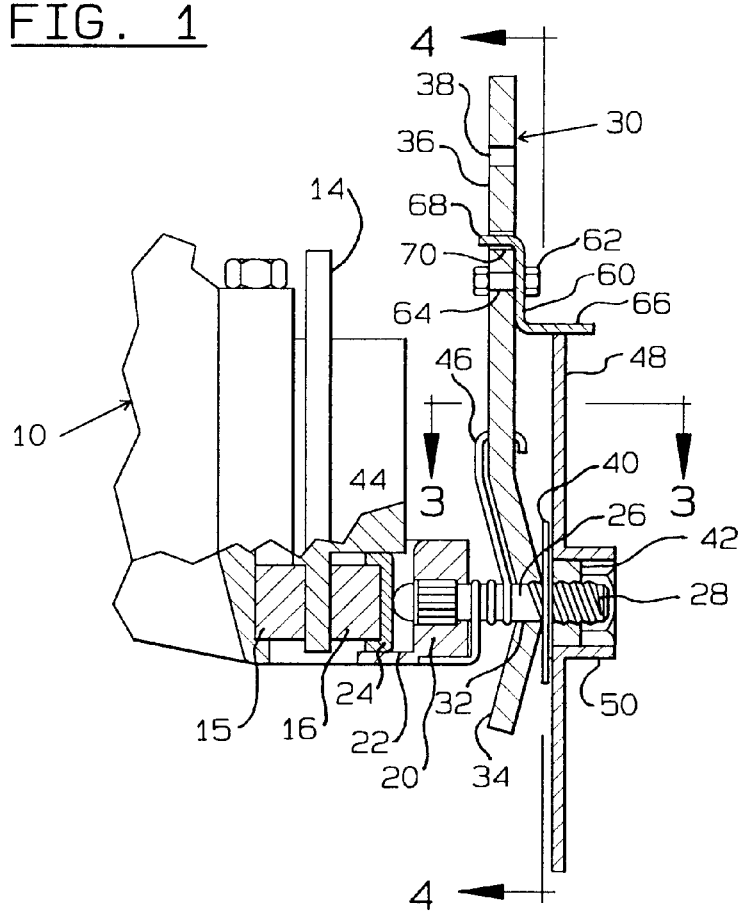
FIG. 2 is an elevational, partially sectioned, view of the automatic brake adjusting mechanism of the invention as taken along Section 2—2 of FIG. 1.

A housing 18 is bolted upon the transaxle 10 and includes a cross member 20 extending outwardly of the disc brake 14 across the lower region thereof. A pocket 22, FIG. 2, is defined in the housing cross member 20 for movably receiving the outer puck 16 and the puck 16 includes an outer puck plate 24 which movably engages the pocket 22 and supports the puck 16.

A brake lever shaft 26 is supported upon the housing cross member 20 and is substantially parallel to the brake shaft 12. At its outer region, the shaft 26 is threaded at 28, and the shaft 26 pivotally supports the brake lever 30 in that the brake lever includes a hole 32 through which the shaft 26 extends permitting the brake lever to be pivotal on the shaft 26 in either direction of rotation. The lower region of the brake lever 30 is of a V configuration forming a pair of V cam surfaces 34, and the upper portion of the brake lever constitutes a handle 36 extending above the disc brake 14 as will be appreciated from FIGS. 1 and 2. A hole 38 is defined in the brake lever handle for receiving a braking rod, not shown, which is connected to a foot operated brake pedal, not shown, or other type of operating lever, and it is this manually operated linkage connected to hole 38 which pivots the brake lever 30 between braking and brake releasing positions.

Figure 3:
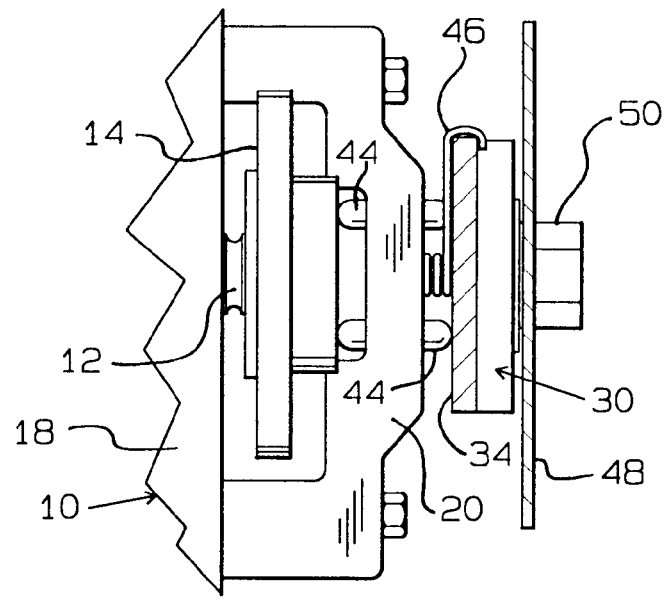
FIG. 3 is a plan partially sectioned view of the automatic brake adjusting mechanism of the invention as taken along Section 3—3 of FIG. 2.

The axial position of the brake lever 30 on the shaft 26 is determined by thrust washers 40 mounted upon shaft 26 and positioned by nut 42. Preferably, nut 42 is of the friction type using a plastic insert or the like which produces friction and prevents unintended rotation of nut 42 in either direction. Accordingly, the axial position of the nut 42 determines the axial position of the brake lever 30 and the cam surfaces 34 with respect to the housing cross member 20. A pair of pins 44, FIG. 3, are slidably mounted within the cross member 20 having convex ends. The inner ends of the pins 44 engage the puck plate 24 of outer puck 16 while the outer ends of the pins 44 engage the cam surfaces 34. Accordingly, when the brake lever 30 is rotated, the cam surfaces 34 engage the pins 44 and rotation of the brake lever 30 will cause the outer ends of the pins 44 to ride upon the cam surfaces 34 displacing the pins 44 toward the puck 16 and forcing the puck 16 against the disc brake 14 to apply a braking action. A torsion spring 46 is wound upon the brake lever shaft 26 and biases the brake lever 30 in a counterclockwise direction, FIGS. 1 and 4, to position the brake lever 30 relative to the pins 44 such that maximum outward movement of the pins 44, i.e. to the right in FIG. 2, is achieved when the brake lever 30 is in its brake releasing position and no drag will be produced by the pucks 15 and 16 on the disc brake 14.

The aforedescribed braking structure is identical to that shown in U.S. Pat. No. 5,195,386, and the torsion spring 46 operates in the identical manner as described in such patent. The automatic brake adjustment constituting the novel subject matter of this application includes a wheel 48 of a generally planar construction having a hexagonal shaped hub 50 having a hexagonal socket closely receiving the friction nut 42 such as by an interference fit, staking or spot welding whereby the wheel 48 is firmly mounted upon the nut 42 for rotation therewith.

The periphery of the wheel 48 includes a plurality of evenly spaced ratchet type teeth 52, each of which includes a radially disposed shoulder 54 intersecting an obliquely disposed surface 56 at an apex 58, as will be apparent from FIG. 1.

A detent 60 is mounted upon the brake lever 30 by a bolt 62 extending through the hole 64 defined in the brake lever handle portion 36. The detent 60 includes an outwardly extending projection 66, and as the detent 60 is preferably formed of a resilient material such as spring steel or the like, the projection 66 is capable of flexing toward and away from the wheel 48. To prevent the detent 60 from rotating upon the bolt 62, a tang 68 is defined on the detent received within slot 70 formed in the brake lever 30.

As will be appreciated from FIGS. 1 and 2, the normal position of the detent projection 66 is such that the forward projection edge 72 will engage a wheel tooth shoulder 54 when the brake lever 30 is rotated in the clockwise braking direction, FIG. 1. Accordingly, engagement of the detent projection edge 72 with a wheel tooth shoulder 54 will rotate the friction nut 42 on the brake lever shaft 26 in a clockwise nut tightening direction, and it will be appreciated that rotation of the nut 42 in a tightening direction will displace the brake lever 30 and the cam surfaces 34 to the left, FIG. 2, causing a displacement of the pins 44 and the puck 16 to the left, FIG. 2, in a braking direction which will compensate for puck wear. The threads 28 are of a fine pitch and a typical adjustment of the puck wear may be of the order of 0.002 inches.

During normal brake lever operation, displacement of the pucks 15 and 16 to brake rotation of the disc brake 14 occurs due to the oscillation of the brake lever 30 and the operation of the puck displacement pins 44 by the cam surfaces 34. However, as the friction material of the pucks 15 and 16 slowly wears, further clockwise rotation of the lever 30 occurs which results in a clockwise small incremental indexing of the wheel 48 due to the engagement of the detent edge 72 with the wheel shoulder 54.

Figure 4:
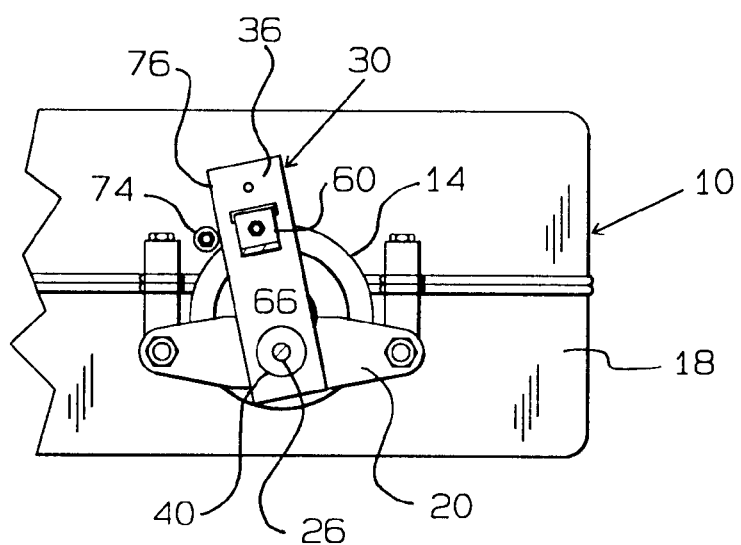
FIG. 4 is an elevational view of the brake adjusting mechanism of the invention as taken along Section 4—4 of FIG. 2.

Each counterclockwise movement of the brake lever 30, FIG. 1, upon movement of the brake lever in a brake releasing direction, pivots the brake lever 30 to its maximum counterclockwise position, FIG. 4, which is determined by engagement with a stop 74 mounted upon the housing 18, FIG. 4, and as the brake lever edge 76 engages the stop 74, the exact position of the brake lever 30 in the brake releasing direction of lever rotation will be the same each brake operation cycle. As the friction material of the pucks 15 and 16 slowly wears, the wheel 48 will be rotated in a clockwise direction, FIG. 1, in small indexing increments to compensate for such wear by rotating the nut 42 and moving the brake lever 30 to the left, FIG. 2, on its shaft 26 causing the pins 44 to be moved toward the disc brake 14 a greater degree.

The wheel 48 does not rotate in a counterclockwise direction as the brake lever 30 is rotated in the brake releasing direction due to the resistance provided by friction nut 42. Accordingly, during each movement of the brake lever 30 toward the stop 74, the projection 66 will ride over the engaged tooth apex 58, or an oblique surface 56, and be deflected upwardly away from the wheel 48. Eventually, the rotation of the wheel 48 in the clockwise direction will be sufficient to align the detent projection edge 72 with the "following" tooth shoulder 54 when the brake lever 30 is in the brake releasing position shown in FIG. 4 wherein brake lever edge 76 engages stop 74. In such instance, the projection 66 will fall into alignment with the following shoulder 54 and the next cycle of braking operation will produce a rotation of the wheel 48 tightening the nut 42 and continue the automatic tightening of the nut 42 to compensate for wear in the pucks to provide effective braking over a long period of time. Eventually, the friction material of the pucks 15 and 16 will be consumed and the pucks must be replaced. However, the automatic brake wear compensation achieved by the invention substantially reduces the brake maintenance interval and permits effective braking to be achieved over long periods of time without attention by the operator.

It is appreciated that various modifications to the inventive concepts may be apparent to those skilled in the art without departing from the spirit and scope of the invention.

I claim:

1. An automatic brake adjustment for transmissions having a rotatable brake disc having an axis of rotation, a brake housing mounted adjacent the disc, a friction puck mounted in the brake housing selectively movable between disc engaging braking and brake release positions, a shaft mounted on the brake housing having an axis substantially parallel to the disc axis, a brake lever rotatably mounted on the shaft selectively rotatable in opposite braking and brake release directions, puck operating means interposed between the puck and the brake lever selectively shifting the puck between braking and brake release positions depending upon the direction of rotation of the brake lever, and puck wear adjustment means defined on the shaft predetermining the axial position of the brake lever on the shaft to adjust for wear at the puck due to engagement with the brake disc, the improvement comprising, automatic non-brake lever supporting puck wear adjustment operating means which is the only means for connection of the brake lever to the puck wear adjustment means sensing the extent of brake lever rotation in a braking direction whereby rotation of the brake lever in the braking direction a predetermined extent automatically adjusts the position of the brake lever upon the shaft to move the puck a greater extent toward the brake disc braking position to compensate for puck wear.

2. In an automatic brake adjustment as in claim 1, wherein the puck wear adjustment means comprises threads defined on the shaft and a nut threaded on said threads in engagement with the brake lever, said automatic puck wear adjustment operating means comprising nut rotating means operatively connected to the brake lever.

3. In an automatic brake adjustment as in claim 2, said nut rotating means comprising nut indexing means mounted on said nut and a nut indexing means operator mounted on the brake lever selectively rotating said nut indexing means.

4. In an automatic brake adjustment as in claim 3, said nut indexing means comprising a wheel mounted on said nut having a generally circular periphery, uniformly spaced detent engaging shoulders defined on said wheel periphery, said nut indexing means operator comprising a detent mounted on the brake lever sequentially engageable with adjacent shoulders upon the brake lever rotating a predetermined distance in the braking direction.

5. In an automatic brake adjustment as in claim 4, ratchet teeth uniformly spaced on said wheel periphery defining said shoulders, and said detent comprising a resilient projection engageable with a shoulder capable of flexing over a ratchet tooth.

* * * * *